United States Patent

Yoshimura et al.

Patent Number: 5,591,781
Date of Patent: Jan. 7, 1997

[54] PROCESS FOR PRODUCING POLYURETHANE FOAM WITH HIGH CURING RATE

[75] Inventors: Hiroyuki Yoshimura; Hideaki Kisaka, both of Shinnanyo; Yutaka Tamano, Tokuyama; Shuichi Okuzono, Kudamatsu, all of Japan

[73] Assignee: Tosoh Corporation, Shinnanyo, Japan

[21] Appl. No.: 328,064

[22] Filed: Oct. 24, 1994

[30] Foreign Application Priority Data

Oct. 27, 1993 [JP] Japan .................. 5-268795
Oct. 27, 1993 [JP] Japan .................. 5-268796

[51] Int. Cl.⁶ .................................. C08G 18/18
[52] U.S. Cl. ......................... 521/129; 521/170
[58] Field of Search ............................ 521/129

[56] References Cited

U.S. PATENT DOCUMENTS

| | | | |
|---|---|---|---|
| 3,074,911 | 1/1963 | Harper | 528/48 |
| 4,199,832 | 4/1980 | Glasscock et al. | 6/1 |
| 4,331,778 | 5/1982 | Sommerfeld et al. | 521/129 |
| 4,515,638 | 5/1985 | Kennedy | 106/162 |
| 5,100,927 | 3/1992 | Tamano et al. | 521/163 |
| 5,104,907 | 4/1992 | Yoshimura et al. | 521/128 |
| 5,304,578 | 4/1994 | Tamano et al. | 521/51 |
| 5,306,738 | 4/1994 | Yoshimura et al. | 521/127 |
| 5,374,666 | 12/1994 | Tamano et al. | 521/129 |

FOREIGN PATENT DOCUMENTS 0012352 6/1980 European Pat. Off. .
908337 10/1962 United Kingdom .

*Primary Examiner*—Rachel Johnson
*Attorney, Agent, or Firm*—Oblon, Spivak, McClelland, Maier & Neustadt, P.C.

[57] ABSTRACT

A process for producing a flexible or rigid polyurethane foam is provided in which a polyol and a polyisocyante are reacted in the presence of an amine catalyst, a blowing agent, and a foam stabilizer, the amine catalyst comprising at least one amine compound represented by General Formula (1) below:

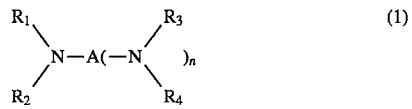

where $R_1$, $R_2$, $R_3$, and $R_4$ are respectively an alkyl group of 1 to 6 carbons independently; n is an integer of 0 or 1; and A is an alkyl group of 11 to 14 carbons when n is 0, or an alkylene group of 10 to 15 carbons when n is 1. The amine catalyst has low odor and low volatility, and gives high curing rate, and excellent moldability with a formulation of reduced fluorocarbon and increased water as the blowing agent.

14 Claims, No Drawings

PROCESS FOR PRODUCING POLYURETHANE FOAM WITH HIGH CURING RATE

BACKGROUND OF THE INVENTION

1. Field of the Invention

The present invention relates to a process for producing a polyurethane foam by the reaction of a polyol with a polyisocyanate in the presence of an amine catalyst, a blowing agent, and a foam stabilizer. Particularly, the present invention relates to a process for producing a flexible or rigid polyurethane foam by use of an amine catalyst having a long-chain aliphatic group in the molecule having less odor and lower volatility and exhibiting high curing rate and improved moldability with a formulation comprising reduced chloro fluorocarbons and increased water as the blowing agent. The flexible polyurethane foam herein includes semi-rigid polyurethane foams, since the same polyol is used.

2. Description of the Related Art

Polyurethane foams are widely used as flexible foams for automobile seat cushions, mattresses, furniture, etc.; as semi-rigid foams for automobile instrument panels, head rests, arm rests, etc.; and as rigid foams for refrigerators, building materials, etc.

In recent years, polyurethane foams are desired to be improved in the curing rate, the demolding time, and the foam yield in order to reduce polyurethane production cost and foam productivity. The polyurethane foam is formed mainly through two reactions including a reaction of a polyol with an isocyanate (gelling reaction) to form a urethane linkage, and a reaction of an isocyanate with water (blowing reaction) to form a urea linkage and to evolve carbon dioxide. The catalyst affects not only the reaction rates but also the curing rate, the moldability, the flowability of the foam, foam density and the properties of the foam.

In recent years, reduction of use of chlorofluorocarbons, so-called CFCs such as trichloromonofluoromethane, and dichlorodifluoromethane which causes ozone layer destruction, improvement of working environment, and reduction of emission of evaporative substances from products, and the like environmental problems are attracting attention. Formulations have been investigated in which CFC as the blowing agent is reduced and water is increased. The increase of water as the blowing agent, however, lowers greatly the curing rate of the foam, and impairs significantly the moldability as well as the adhesive strength and dimensional stability of the rigid foam. Accordingly, a catalyst is strongly requested which is suitable for the formulation containing a decreased amount of CFC and increased amount of water.

As the catalyst for polyurethane production, organometallic compounds and tertiary amines are known. The tertiary amine is widely known to be an excellent catalyst for production of polyurethane. The tertiary amine employed industrially for polyurethane production is exemplified by triethylenediamine, N,N,N',N'',N''-pentamethyldiethylenetriamine, N,N,N',N'-tetramethylhexamethylenediamine, N-methyl-N'-(2-dimethylaminoethyl)piperazine, triethylamine, N-methylmorpholine, N-ethylmorpholine, dimethylcyclohexylamine, dimethylbenzylamine, etc. Of these polyurethane production catalysts, triethylamine, N-methylmorpholine, N-ethylmorpholine, and N,N,N',N'-tetramethylhexamethylenediamine, which have a relatively low molecular weight and exhibit high volatility, are widely used owing to satisfactory effects on curing rate, moldability, and foam properties.

The polyurethane production catalysts having been developed up to now have various disadvantages as follows. Tertiary amines emit offensive strong odor. In particular, amines of relatively low molecular weight such as N-methylmorpholine, N-ethylmorpholine, triethylamine, N,N,N',N'-tetramethylhexamethylenediamine, dimethylcyclohexylamine, etc. emit extremely pungent odor, and worsen the working environment greatly by the strong odor in the foaming process. Particularly when a larger amount of an amine catalyst is used, blurring of eye (eye rainbow) or a like symptom is frequently caused. Furthermore, the resulting polyurethane product has also residual offensive odor, or emits the amine to impair the value of the product, disadvantageously.

Conventionally, CFCs have been used as the blowing agent in production of flexible or rigid polyurethane foams. In recent years, destruction of the ozone layer by CFCs has come to be noticed. Consequently, reduction of use of CFCs is an urgent problem. For this purpose, polyurethane foam formulations have been studied which use a less amount of CFC and an increased amount of water as a substituting blowing agent. The increase of water in place of the CFC, however, give rise to various technical problems. In production of flexible polyurethane foams, water reacts rapidly with the isocyanate with violent gas evolution, which causes difficulties in foam formation, or deterioration of moldability such as considerable drop of curing rate at the surface and the interior, exfoliation of the skin layer, void formation, roughening of cells, and so forth. On the other hand, the production of rigid polyurethane foams involves serious problems such as the increase of crystalline urea linkage which is formed by the reaction of water with isocyanate causes brittleness of the foam surface, resulting in drop of bonding strength, increase of friability, as well as the drop of dimension stability, and other disadvantages.

In order to solve such problems, compounds having an active hydrogen-containing group capable of reacting with an isocyanate, and amine catalysts having a relatively high molecular weight are disclosed. The compounds having an active hydrogen group include amine compounds such as N,N-dimethylethanolamine, N,N-dimethylaminoethoxyethanol, etc. However, N,N-dimethylethanolamine and N,N-dimethylamino-ethoxyethanol have also disadvantages of offensive odor. Moreover the rapid deactivation during the foam-formation process by the reaction with isocyanate causes insufficient catalytic activity at the later period of polyurethane formation reaction, low curing rate, longer demolding time in a mold tool, and unsatisfactory moldability, and so forth.

Amine catalysts having a relatively high molecular weight comprising an aliphatic monoamine of 6 to 10 carbons are disclosed to be useful in formulations as amine catalyst for rigid foams which employ a CFC as a blowing agent with a small amount of water. Aliphatic monoamines of 11 carbons or higher are shown to have disadvantages of significantly low catalytic activity, inferior properties of foams, and significantly low surface curing properties (JP-A-58-93715).

The present invention has been accomplished to solve the above problems.

SUMMARY OF THE INVENTION

The present invention intends to provide a process for producing a flexible or rigid polyurethane foam by use of a catalyst which has less odor and lower volatility, and gives high curing rate, improved moldability, and excellent physical properties of the polyurethane foam with a formulation of reduced fluorocarbon and increased water as the blowing agent.

After comprehensive investigation to solve the problems of the known catalysts, it was found by the inventors of the present invention that a high molecular amine compound having a long-chain aliphatic group as the catalyst raises the curing rate and improves the moldability with extremely faint odor and low volatility of the catalyst in a formulation with decreased CFC and increased water as the blowing agent. It was also found that use of the catalyst of the present invention in combination with a specific amine enables reduction of total catalyst amount, and gives a polyurethane foam which is excellent in curing rate, moldability as well as wet-heat compression set, dimension stability, adhesive strength of the polyurethane foam. The present invention has been thus accomplished.

The present invention provides a process for producing polyurethane foam by the reaction of a polyol with a polyisocyanate in the presence of an amine catalyst, a blowing agent, and a foam stabilizer, the amine catalyst comprising at least one amine compound represented by General Formula (1) below:

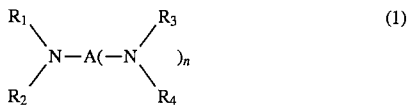

(1)

where $R_1$, $R_2$, $R_3$, and $R_4$ are respectively an alkyl group of 1 to 6 carbons independently; n is an integer of 0 or 1; and A is an alkyl group of 11 to 14 carbons when n is 0, or an alkylene group of 10 to 15 carbons when n is 1.

DETAILED DESCRIPTION OF THE PREFERRED EMBODIMENT

Flexible polyurethane foams have generally an open cell structure exhibiting high air-permeability (air-flow) and reversible deformability, as described by Gunter Oertel (Polyurethane Handbook, pp. 161–233) and Keiji Iwata (Poriuretan Jushi Handobukk (Polyurethane Resin Handbook), pp. 150–221). The physical properties of a flexible polyurethane foam depend on the chemical structure of the starting polyol and isocyanate, amount of the blowing agent, the chemical factors such as the isocyanate index, the intended cell structure, etc. Generally, as shown in the above cited Polyurethane Handbook, pp. 184–191 and pp. 212–218, and Poriuretan Jushi Handobukk, pp. 160–166 and pp. 186–191, the flexible polyurethane foam has a density ranging from 10 to 100 kg/m³ (JIS K 6401), a compression strength (IDL 25%) ranging from 2 to 80 kgf (20 to 800N) (JIS K 6401), and an elongation ranging from 80 to 500% (JIS K 6301), but are not limited thereto.

The flexible polyurethane foam of the present invention includes semi-rigid polyurethane foam in view of the starting materials and foam properties. Semi-rigid polyurethane foams, as shown in the above cited Polyurethane Handbook, pp. 223–233, and Poriuretan Jushi Handobukk, pp. 211–221, have an open cell structure similar to flexible polyurethane foams exhibiting high air-permeability and reversible deformability although the foam density and compression strength are higher than those of the flexible polyurethane foam. The starting polyol and isocyanate are similar to the flexible polyurethane foam. Therefore, the semi-rigid polyurethane foams are generally included in flexible polyurethane foams. The semi-rigid polyurethane foam has generally a density ranging from 40 to 800 kg/m³, 25%-compression strength ranging from 0.1 to 2 kgf/cm² (9.8 to 200 kPa), and an elongation ranging from 40 to 200%. The properties, however, are not limited thereto.

The rigid polyurethane foam of the present invention has a highly crosslinked closed cell structure and is not capable of being reversible deformation, and has properties quite different from the properties of flexible foams, and semi-rigid foams, as shown in the above cited Polyurethane Handbook, pp. 234–313, and Poriuretan Jushi Handobukk, pp. 224–283. The rigid foam has generally a density ranging from 20 to 100 kg/m³, and a compression strength ranging from 0.5 to 10 kgf/cm² (50 to 1000 kPa), but the properties are not limited thereto.

The amine catalyst of the present invention is a compound represented by General Formula (1) above, wherein the group A may be linear or branched.

The long-chain aliphatic monoamine having the group A of 11 to 14 carbons is exemplified by dimethyldodecylamine, dimethyltetradecylamine, etc. The monoamines of 10 carbons or lower emit amine odor and are highly volatile. Therefore, working environment cannot readily be improved with such lower monoamine, or emission of the lower amine cannot be prevented, and the curing rate is low and productivity of the urethane foam is low with the lower amine. On the other hand, the monoamine of 15 carbons or higher exhibits remarkably lower catalytic activity and lower curing properties, and needs to be used in a larger amount, which is disadvantageous in cost and productivity of polyurethane foams.

The long-chain aliphatic diamine having the group A of 10 to 15 carbons is exemplified by tetramethyl-decane-diamine, tetramethyl-undecane-diamine, tetramethyl-dodecane-diamine, tetramethyl-tetradecane-diamine, etc. The diamines of 9 carbons or lower emit amine odor and exhibit high volatility. Therefore, working environment cannot readily be improved with such lower diamine, or emission of the lower amine cannot be prevented, although such a diamine is effective to improve the curing rate of the foam. On the other hand, a diamine of 16 carbons or higher exhibits remarkably lower catalytic activity and a lower curing rate, and needs to be used in a larger amount, which is disadvantageous in production of polyurethane.

The amine catalyst of the present invention may be produced by any known conventional method, and the production process thereof is not specially limited. For example, it can be produced readily by reduction methylation of a starting monoamine or diamine.

The amine catalyst represented by General Formula (1) is preferably used in combination with other gelling catalyst and/or a blowing catalyst in the present invention.

The gelling catalyst means a tertiary amine catalyst which accelerates particularly the reaction of a polyisocyanate and a polyol, and are exemplified by triethylenediamine, 1,8-diazabicyclo[5.4.0]undecene-7, and imidazoles such as 1-methylimidazole, 1,2-dimethylimidazole, and 1-isobutyl-2-methylimidazole etc. The blowing catalyst means a tertiary amine catalyst which accelerates particularly the reaction of an isocyanate with water to evolve carbon dioxide effectively, and are exemplified by bis(2-dimethylaminoethyl)ether, N,N,N',N'',N''-pentamethyldiethylenetriamine, N,N,N',N'',N''',N'''-hexamethyltriethylenetetramine, etc.

The composition of the amine catalyst of the present invention (represented by General Formula (1)) and the gelling catalyst contains preferably 20 to 95% by weight of the amine catalyst of the present invention and 80 to 5% by weight of the gelling catalyst based on the total amount of the catalyst. At the ratio of the gelling catalyst of not more than 80% by weight, the curing rate, the flowability, and the moldability of the foam are improved, whereas at the ratio thereof of not less than 5% by weight, the total amount of the catalyst can be reduced, which is advantageous in production cost.

The composition of the amine catalyst of the present invention (represented by General Formula (1)) and the blowing catalyst contains preferably 40 to 99% by weight of the amine catalyst of the present invention and 60 to 1% by weight of the blowing catalyst based on the total amount of the catalyst. At the ratio of the blowing catalyst of not more than 60% by weight, the initial foaming rate is appropriate, the liquid flowability is maintained, and the curing rate, the moldability, and the surface adhesion properties of the rigid foams are improved, whereas at the ratio thereof of not less than 1% by weight the foam-flowability is improved and the total amount of the catalyst is reduced, which is advantageous in production cost.

When both of the gelling catalyst and the blowing catalyst are combined with the amine catalyst of the present invention (represented by General Formula (1)), the catalyst mixture contains preferably 19 to 90% by weight of the amine catalyst of the present invention, 80 to 5% by weight of the gelling catalyst, and 60 to 1% by weight of the blowing catalyst.

The amine catalyst of the present invention may be combined with a cocatalyst including other tertiary amines, tertiary amine compounds having an active hydrogen reactive to the isocyanate, organometal compounds, and/or metal carboxylates for polyurethane production. The above mentioned other tertiary amines combined with the catalyst of the present invention include tertiary amines such as triethylamine, N,N-dimethylcyclohexylamine, N,N,N',N'-tetramethylethylenediamine, N,N,N',N'-tetramethylpropylenediamine, N,N,N',N'',N''-pentamethyl-(3-aminopropyl)ethylenediamine, N,N,N',N'',N''-pentamethyldipropylenetriamine, N,N,N',N'-tetramethylguanidine, 1,3,5-tris(N,N-dimethylaminopropyl)hexahydro-s-triazine, N,N,N',N'-tetramethylhexamethylenediamine, N-methyl-N'-(2-dimethylaminoethyl)piperazine, N,N'-dimethylpiperazine, N-methylpiperazine, N-methylmorpholine, and N-ethylmorpholine etc. The above mentioned tertiary amine compounds having an active hydrogen include alkanolamines such as N,N-dimethylaminoethanol, N,N-dimethylaminoisopropanol, N,N-dimethylaminoethoxyethanol, N,N,N'trimethylaminoethylethanolamine, N,N,N'-trimethyl-N'-hydroxyethyl-bisaminoethyl ether, N,N-bis(3-dimethylaminopropyl)-N-isopropanolamine, N-(3-dimethylaminopropyl)-N,N-diisopropanolamine, N-(2-hydroxyethyl)-N'-methylpiperazine, and N,N-dimethylaminohexanol; and amine compounds having both a primary amino group and a secondary amino group such as dimethylaminopropylamine, and bis(dimethylaminopropyl)amine. Such an amine compound having active hydrogen reacts with the isocyanate to be incorporated into the foam, thereby reducing volatilization of amine.

The amine catalyst of the present invention may be combined with an organometal compound and/or a metal carboxylate as a cocatalyst. The organometal compound includes stannous diacetate, stannous dioctoate, stannous dioleate, stannous dilaurate, dibutyltin oxide, dibutyltin diacetate, dibutyltin dilaurate, dibutyltin dichloride, dioctyltin dilaurate, lead octanoate, lead naphthenate, nickel naphthenate, and cobalt naphthenate. Of these organometal compounds, organotin compounds are preferred, stannous dioctate and dibutyltin dilaurate being more preferred. The metal caoboxylate includes alkali metal salts or alkaline earth metal salts of carboxylic acids. The carboxylic acid includes aliphatic mono- and di-carboxylic acids such as acetic acid, propionic acid, 2-ethylhexanoic acid, and adipic acid; aromatic mono- and di-carboxylic acids such as benzoic acid, and phthalic acid, but are not limited thereto. The salt-forming alkali metal includes lithium, sodium, and potassium; and the salt-forming alkaline earth metal includes calcium, and magnesium, but the metal is not limited thereto.

The usual amount of the catalyst of the present invention in polyurethane production is generally in the range of from 0.01 to 10 parts by weight based on 100 parts by weight of the polyol, but is not limited thereto. The amount of the aforementioned other amine catalyst, the organometal compound, and the metal carboxylate to be used in combination with the amine catalyst of the present invention is generally in the range of from 0.01 to 5 parts by weight, but is not limited thereto.

Further, an organic carboxylic acid salt of the amine compound of the present invention, and an organic carboxylic acid salt of the aforementioned tertiary amine may be used suitably as the catalyst and the cocatalyst provided that the function as the catalyst of the present invention is not impaired.

The amine catalyst of the present invention may be used singly or in combination with other amine catalyst as described above. In mixing of the catalyst components, a solvent such as dipropylene glycol, ethylene glycol, 1,4-butanediol and water may be used, if necessary. The solvent is used in an amount preferably of not more than 70% by weight of the entire catalyst components, but the amount is not limited thereto. The catalyst thus prepared may be added to the polyol. Otherwise, respective amine catalyst component may be separately added to the polyol. The method of the catalyst addition is not specially limited.

The polyol which is useful in the polyurethane production with the amine catalyst of the present invention includes generally known polyesterpolyols, polyetherpolyols, polymerpolyols, and mixtures thereof. The known polyesterpolyols are derived from a dibasic acid and a polyhydric alcohol. The known polyetherpolyols are derived by addition reaction of ethylene oxide, propylene oxide or the like to a polyhydric alcohol such as glycol, glycerin, pentaerythritol, trimethylolpropane, sorbitol, and sucrose; an aliphatic amine such as ammonia, ethylenediamine, and ethanolamines; or aromatic amines such as toluenediamine, and diphenylmethane-4,4'-diamine, or a mixture thereof. The known polymer polyols are derived by reaction of the polyetherpolyol with an ethylenic unsaturated monomer such as butadiene, acrylonitrile, and styrene in the presence of a radical polymerization initiator.

In the production of a flexible polyurethane foam, the polyol is preferably a polyetherpolyol and/or a polymerpolyol. The polyol has an average functionality ranging preferably from 2 to 5, and an average hydroxyl number ranging preferably from 20 to 100 mgKOH/g, more preferably from 20 to 80 mgKOH/g, and contains oxyethylene groups at a content preferably not more than 90%. Incidentally, the flexible polyurethane herein includes semi-rigid polyurethane foams since the starting polyol is the same.

In the production of a rigid polyurethane foam, the polyol has an average functionality ranging usually from 4 to 8, and an average hydroxyl number ranging preferably from 200 to 800 mgKOH/g, more preferably from 300 to 700 mgKOH/g.

The polyisocyanate useful in the polyurethane foam production with the catalyst of the present invention may be any known polyisocyanate, including aromatic polyisocyanates such as toluene diisocyanate (TDI), 4,4'-, or 4,2'-diphenylmethane diisocyanate (MDI), naphthylene diisocyanate, and xylylene diisocyanate; alicyclic polyisocyanates such as isophorone diisocyanate; aliphatic polyisocyanates such as hexamethylene diisocyanate; free isocyanate-containing prepolymer derived by reaction of a polyol with the above polyisocyanate; modified polyisocyanate such as carbodimide-modified polyisocyanates; and mixtures thereof. Of these, preferred are TDI and derivatives thereof, and MDI and derivatives thereof, and mixtures thereof. TDI and derivatives include mixtures of 2,4-TDI and 2,6-TDI, and TDI-terminated isocyanate prepolymer derivatives. MDI and derivatives thereof includes mixtures of MDI and its polymer, polyphenylmethylene isocyanate (so-called polymeric-MDI), and/or isocyanate-terminated diphenylmethane diisocyanate derivatives.

In the production of polyurethane foam, by use of the catalyst of the present invention foam, any physical or chemical blowing agent excluding chlorofluorocarbons (CFCs) is useful.

In the production of rigid polyurethane foam, water is indispensable as a blowing agent. The known physical blowing agents include hydrocarbons such as pentane, and cyclopentane; hydrochlorofluorocarbons such as HCFC-22, and 141b; hydrofluorocarbons such as HFC-134a, 245 and 356; air, nitrogen, and carbon dioxide, and their mixtures. The known chemical blowing agents include water, organic acids, inorganic acids like boric acid, alkali carbonates, cyclic carbonates, dialkyl carbonates, etc. which evolve gas by reaction with polyurethane resin components or by decomposition on heating, etc.

In the production of flexible polyurethane foams, water is preferred as a blowing agent. The amount of water is preferably in the range of from 2 to 10 parts by weight, more preferably from 2 to 7 parts by weight based on 100 parts by weight of the polyol.

In the production of rigid polyurethane foams, the blowing agent includes water, and mixtures of water with a hydrocarbon, a hydrochlorofluorocarbon, or a hydrofluorocarbon. The amount of water is preferably in the range of from 2 to 15 parts by weight, more preferably from 2 to 10 parts by weight based on 100 parts of the polyol. With excessive amount of water, the curing rate becomes lower, the blowing process range becomes narrower, the foam density becomes lower, or the moldability becomes worse. The amount of the hydrocarbon, the hydrochlorofluorocarbon, or the hydrofluorocarbon to be combined with the water is suitably selected depending on the desired density of the foam, and is preferably not more than 40 parts by weight, more preferably not more than 30 parts by weight based on 100 parts by weight of the polyol, but is not limited thereto.

The foam stabilizer employed in the present invention may be any known one, and is exemplified by nonionic surfactants such as organosiloxanepolyoxyalkylene copolymers, and silicone-grease copolymers, and mixtures thereof. The amount thereof to be used is usually in the range of from 0.1 to 10 parts by weight based on 100 parts by weight of the polyol.

A crosslinking agent or a chain extender may be added, if necessary, in the present invention. The crosslinking agent or the chain extender includes low-molecular polyhydric alcohols such as ethylene glycol, diethylene glycol, 1,4-butanediol, and glycerin; low-molecular amine polyol such as diethanolamine, and triethanolamine; polyamines such as ethylene diamine, xylylenediamine, and methylene-bis(o-chloroaniline); and the like.

Further, a coloring agent, a flame retardant, an antioxidant, or other known additives may be added to the polyurethane foam of the present invention in conventional amounts.

The amine catalyst for polyurethane production of the present invention, which has a higher molecular weight and a lower vapor pressure than conventional amine catalysts, emits extremely less odor, thereby improving working environment for polyurethane production significantly, and giving no residual odor and reducing the volatile matter in the produced polyurethane foam. Furthermore, in the formulation with less amount of CFC and larger amount of water, the amine catalyst of the present invention raises curing rate of the foam and improves the moldability, thereby improving remarkably the productivity and yield of the foam.

The present invention is described below in more detail by reference to Examples and Comparative Examples without limiting the invention in any way.

EXAMPLES 1–10, AND COMPARATIVE EXAMPLES 1–8

Polyurethane foams were prepared with the starting materials and the foaming conditions shown below. The resulting foams were tested for physical properties. The flexible polyurethane foams were tested for moldability and curing rate in the manner as shown later. The results are shown in Tables 1 to 4.

a. Formulation A

| Polyol A[1)] | 60.0 (parts by weight) |
| --- | --- |
| Polyol B[2)] | 40.0 |
| Water | 2.7 |
| Foam stabilizer[3)] | 2.0 |
| Amine catalyst[4)] | Changed |
| Isocyanate[5)] | Index = 105 |

1) Polyetherpolyol (FA-703, produced by Sanyo Chemical Industries, Ltd., OH number=34 mgKOH/g)

2) Polymer polyol (FA-728R, produced by Sanyo Chemical Industries, Ltd., OH number=28 mg/KOH/g)
Average functionality of mixture of polyols 1) and 2): 3

3) SRX-274C (produced by Toray Industries, Inc.)

4) Abbreviations of catalyst names;

TEDA-L33: 33.3% triethylenediamine solution in dipropylene glycol (produced by Tosoh Corporation)

TOYOCAT-ET: 70% bis(2-dimethylaminoethyl)ether solution in dipropylene glycol (produced by Tosoh Corporation)

DMDOA: N,N-dimethyldocecylamine (monoamine of Formula (1) with A of 12 carbons)

DMTDA: N,N-dimethyltetradecylamine (monoamine of Formula (1) with A of 14 carbons)

DMOA: N,N-dimethyloctylamine (monoamine of Formula (1) with A of 8 carbons)

DMHDA: N,N-dimethylhexadecylamine (monoamine of Formula (1) with A of 16 carbons)

TMDDA: N,N,N',N'-tetramethyl-decane-diamine (diamine of Formula (1) with A of 10 carbons)

TMUNDA: N,N,N',N'-tetramethyl-undecane-diamine (diamine of Formula (1) with A of 11 carbons)
TMDODA: N,N,N',N'-tetramethyl-dodecane-diamine (diamine of Formula (1) with A of 12 carbons)
TMHMDA: N,N,N',N'-tetramethylhexamethylenediamine (diamine of Formula (1) with A of 6 carbons)
TMHDDA: N,N,N',N'-tetramethyl-hexadecane-diamine (diamine of Formula (1) with A of 16 carbons)
NEM: N-ethylmorpholine
TEA: Triethylamine
DMEA: N,N-dimethylaminoethanol 5) TDI/crude MDI=80/20 (TDI: 2,4-TDI/2,6-TDI=80/20, produced by Nippon Polyurethane Industry Co., Ltd), (crude MDI: MR-200 produced by Nippon Polyurethane Industry Co., Ltd.)

b. Foaming conditions
Starting material temperature: 20°±1° C.
Stirring speed: 6000 rpm (5 sec)

c. Measurement

The starting material mixture for polyurethane was poured into 2-liter polyethylene cup and allowed to blow at room temperature (20° to 25° C.). The reactivity, foam density, etc. were measured with the resulting polyurethane.

Reactivity:
Cream time: Time before beginning of foaming (seconds)
Gel time: Resinification time (seconds)
Rise time: Time to reach the maximum foam height (seconds)

Foam density:
Density (kg/m³) of a test specimen of 6×6×8 cm cut out from the center portion of the foam Curing rate:
The starting material mixture of polyurethane foam was poured into an aluminum mold (internal dimension: 50×30×10 cm) having a portion for a thin part (10×30×0.5 cm) adjusted to 50° C., and allowed to foam therein. After 5.5 minutes, the upper lid of the mold was taken out, and the thin part of the foam was compressed with a marker (20 mm in diameter, about 2.5 kg in weight) repeatedly for 5 seconds at intervals of 10 seconds on the different position of the foam. The time elapsed from the starting time of mixing before no mark of compression come to be observed was defined as the curing rate (minutes).

Moldability:
The above foam having blown in the mold was evaluated for void formation, skin roughness, skin exfoliation on three grades:

1: negligible
2: medium
3: a little conspicuous
4: conspicuous

Wet-heat compression set:

The starting material mixture of polyurethane foam was poured into an aluminum mold (internal dimension: 30×30×10 cm) kept at 50° C., and was allowed to foam therein. 7 Minutes later, the resulting foam was taken out from the mold, and was immediately subjected to crushing treatment. The foam was aged at room temperature for 24 hours. After the aging, four test pieces (70×70×60 mm) were cut out from the core portion of the foam. The dimension of the test pieces were measured precisely. The test pieces were compressed to the size of 50%, and were aged in an oven at a temperature of 70° C. and humidity of 95% for 22 hours. Then the test pieces were left standing at room temperature for 30 minutes. The dimensions of the test pieces were measured, and the compression set was calculated by the equation below:

Wet heat compression set (%)=((A−B)/A)×100

A: Initial thickness of test piece (mm)
B: Thickness of test piece after aging test (mm)

Odor of amine catalyst:

5.0 Parts by weight of the catalyst was mixed with 100 parts by weight of a polyol (FA703). The mixture was smelled by 10 persons, and the degree of the odor was evaluated based on the standard below. In the case of combined catalysts, 5.0 parts by weight of the combined catalyst was mixed with 100 parts by weight of the polyol.

Strong: All 10 person perceive strong odor
Medium: 4 or more out of 10 persons perceive weak odor
Faint: 3 or less out of 10 persons perceive faint odor
None: All 10 persons do not perceive odor Tables 1 to 4 clearly show that use of the specified long chain aliphatic monoamine or diamine as the amine catalyst has a reduced odor of the catalyst, and enables flexible polyurethane foam production with excellent moldability at high curing rate. Combination of this catalyst with a gelling catalyst or a blowing catalyst enables reduction of the total amount of the required catalysts without impairing the catalytic activity, and is effective in improving wet heat compression set in comparison with single use of the catalyst of the present invention.

On the other hand, in Comparative examples 1, and 4 to 6, conventional amine catalysts, and low molecular amine catalysts such as NEM, TEA, and DMEA emit strong odor, not giving high curing rate, and not giving sufficient moldability, thereby involving disadvantages in working environment and foam productivity. In Comparative Examples 2, 3, 7, and 8, the amine catalysts having a skeleton analogous to that of the amine of the present invention were not effective in improvement of catalyst odor, curing rate, moldability, and wet-heat compression set without achieving the intention.

EXAMPLES 11–20, AND COMPARATIVE EXAMPLES 9–17

Polyurethane foams were prepared with the formulations below and under the same foaming conditions as in Examples 1 to 5. The resulting rigid polyurethane foams were tested for properties. The flowability, the adhesion strength, and the dimensional stability were measured by the methods below. The results are shown in Tables 5 to 8.

a. Formulation B

| Polyol C[6] | 50.0 (parts by weight) |
|---|---|
| Polyol D[7] | 50.0 |
| Water | 4.0 |
| HCFC-141b | 11.0 |
| Foam stabilizer[8] | 1.5 |
| Amine catalyst[9] | Changed |
| Isocyanate[10] | Index = 110 |

6) Polyetherpolyol (NT-400, produced by Mitsui Toatsu Chemicals, Inc., OH number=390 mgKOH/g)
7) Polyetherpolyol (SU-464, produced by Mitsui Toatsu Chemicals, Inc., OH number=450 mg/KOH/g)
Average functionality of mixture of polyols 6) and 7): 5
8) SZ-1627 (produced by Nippon Unicar Co., Ltd. )
9) Abbreviations of catalyst names;

DMCHA: N,N-dimethylcyclohexylamine

MDCHA: N,N-dicyclohexylmethylamine
TOYOCAT-DT: N,N,N',N'',N''-pentamethyldiethylenetriamine
10) Crude MDI (MR-200, produced by Nippon Polyurethane Industry Co.)

b. Measurement

The starting material mixture for the polyurethane was poured into 2-liter polyethylene cup and allowed to blow at room temperature (20° to 25° C.). The reactivity, free blowing density, etc. were measured.

Reactivity:

Cream time: Time before beginning of foaming (seconds)

Gel time: Resinification time (seconds)

Tack-free time: Time before dissipation of stickiness of the top surface (seconds)

Rise time: Time to reach the maximum foam height (seconds)

Curing rate:

The hardness of the upper surface of freely blown foam was measured with a Shore C hardness meter. The higher hardness means higher curability.

Flowability of the foam:

A freely blown foam was prepared in an aluminum mold (50×4.5×50 cm), and the density (kg/m$^3$) was measured. The lower density means the higher flowability.

Adhesion strength:

A foam was prepared in an aluminum mold (25×8×25 cm) kept at 30° C. and in which a galvanized sheet iron (50×50 mm) was placed on its inside lateral face. Ten minutes after the blowing, 90° peel strength (kg/25cm$^2$) was measured as the adhesion strength.

Dimensional stability:

A freely blown foam was prepared in an aluminum mold (25×8×25 cm). The core portion was cut out in a size of 20×6×20 cm was subjected to aging at 20° C. for 70 days. The volume change (%) by the aging was measured.

Odor of amine catalyst:

The odor was evaluated in the same manner as in Examples 1 to 5.

Tables 5 to 8 clearly show that the use of the specified long-chain aliphatic monoamine or diamine as the amine catalyst reduces the odor of the catalyst, and enables rigid polyurethane foam production with excellent foam properties at high curing rate. With a formulation in which a smaller amount of a hydrofluorocarbon was used in place of CFCs and an increased amount of water was used, a foam could be produced with high foam flowability, high adhesion strength, and high dimensional stability. Further, combination of this catalyst with a gelling catalyst or a blowing catalyst enabled reduction of the total amount of the required catalysts without impairing the catalytic activity. The combination with a gelling catalyst enabled formation of a foam with high curing rate and a high dimensional stability, while the combination with a blowing catalyst enabled foam production with high flowability, low density, and high dimensional stability.

On the other hand, in Comparative examples 10 and 11, a conventional gelling catalyst and/or blowing catalyst without the catalyst of the present invention, the foam flowability was poor and the properties of the foam were inferior. Conventionally employed low molecular amines such as DMCHA used for rigid foam production emited strong odor, giving low curing rate and low adhesion strength, involving disadvantages in working environment and foam productivity. MDCHA, a high molecular amine catalyst, emitted less odor, but gave low curing rate and low adhesion strength disadvantageously. In Comparative Examples 12, 13, 16, and 17, the amine catalysts having a skeleton analogous to that of the amine of the present invention were not effective in improvement of catalyst odor, curing rate, and foam forming properties without achieving the intention.

TABLE 1

| | Example | | | | |
|---|---|---|---|---|---|
| | 1 | 2 | 3 | 4 | 5 |
| Catalyst (parts by weight) * | | | | | |
| TEDA-L33 | — | 0.52 | — | 0.32 | 0.32 |
| TOYOCAT-ET | — | — | 0.30 | 0.08 | 0.08 |
| DMDOA | 2.40 | 1.20 | 1.20 | 1.20 | — |
| DMTDA | — | — | — | — | 1.35 |
| DMOA | — | — | — | — | — |
| DMHDA | — | — | — | — | — |
| NEM | — | — | — | — | — |
| TEA | — | — | — | — | — |
| DMEA | — | — | — | — | — |
| Reactivity (seconds) | | | | | |
| Cream time | 9 | 9 | 7 | 8 | 8 |
| Gel time | 82 | 80 | 80 | 79 | 80 |
| Rise time | 120 | 115 | 113 | 114 | 115 |
| Foam properties | | | | | |
| Free density (Kg/m$^3$) | 41.2 | 40.1 | 40.8 | 40.4 | 40.7 |
| Mold density (kg/m$^3$) | 50.8 | 50.5 | 50.9 | 50.8 | 50.5 |
| Moldability | 1 | 1 | 2 | 1 | 1 |
| Curing rate (min) | 6'50" | 6'40" | 6'50" | 6'40" | 6'40" |
| Wet-heat compression set (%) | 18.5 | 16.5 | 17.2 | 16.5 | 17.0 |
| Odor ** | None | Fnt | Fnt | Fnt | Fnt |

* Weight parts based on 100 parts by weight of polyol
** Strg: strong, Med: medium, Fnt: faint

TABLE 2

| | Comparative Example | | | | | |
|---|---|---|---|---|---|---|
| | 1 | 2 | 3 | 4 | 5 | 6 |
| Catalyst (parts by weight) * | | | | | | |
| TEDA-L33 | 0.61 | 0.32 | 0.32 | 0.32 | 0.32 | 0.32 |
| TOYOCAT-ET | 0.15 | 0.08 | 0.08 | 0.08 | 0.08 | 0.08 |
| DMDOA | — | — | — | — | — | — |
| DMTDA | — | — | — | — | — | — |
| DMOA | — | 0.80 | — | — | — | — |
| DMHDA | — | — | 1.50 | — | — | — |
| NEM | — | — | — | 3.30 | — | — |
| TEA | — | — | — | — | 0.76 | — |
| DMEA | — | — | — | — | — | 0.75 |
| Reactivity (seconds) | | | | | | |
| Cream time | 7 | 9 | 8 | 8 | 8 | 7 |
| Gel time | 80 | 81 | 79 | 79 | 80 | 79 |
| Rise time | 115 | 115 | 117 | 117 | 115 | 107 |
| Foam properties | | | | | | |
| Free density (Kg/m$^3$) | 40.8 | 40.6 | 40.5 | 40.9 | 40.4 | 40.6 |
| Mold density (kg/m$^3$) | 50.3 | 50.5 | 50.6 | 50.7 | 50.8 | 50.6 |
| Moldability | 3 | 1 | 2 | 3 | 1 | 4 |
| Curing rate (min) | 7'50" | 8'00" | 7'50" | 7'50" | 7'00" | 8'0 |
| Wet-heat compression set (%) | 18.0 | 19.0 | 19.5 | 20.5 | 18.0 | 22.0 |
| Odor ** | Med | Strg | Fnt | Strg | Strg | Strg |

* Weight parts based on 100 parts by weight of polyol
** Strg: strong, Med: medium, Fnt: faint

TABLE 3

| | Example | | | | |
|---|---|---|---|---|---|
| | 6 | 7 | 8 | 9 | 10 |
| **Catalyst (parts by weight) *** | | | | | |
| TEDA-L33 | — | — | 0.32 | 0.32 | 0.32 |
| TOYOCAT-ET | — | — | 0.08 | 0.08 | 0.08 |
| TMDDA | 0.98 | — | 0.47 | — | — |
| TMUNDA | — | 1.05 | — | 0.52 | — |
| TMDODA | — | — | — | — | 0.57 |
| TMHMDA | — | — | — | — | — |
| TMHDDA | — | — | — | — | — |
| NEM | — | — | — | — | — |
| DMEA | — | — | — | — | — |
| Reactivity (seconds) | | | | | |
| Cream time | 9 | 9 | 9 | 8 | 8 |
| Gel time | 80 | 81 | 79 | 80 | 80 |
| Rise time | 111 | 113 | 110 | 112 | 115 |
| Foam properties | | | | | |
| Free density (Kg/m$^3$) | 40.4 | 40.5 | 40.0 | 40.5 | 40.9 |
| Mold density (kg/m$^3$) | 50.1 | 50.6 | 50.5 | 50.6 | 50.8 |
| Moldability | 1 | 1 | 1 | 1 | 1 |
| Curing rate (min) | 6'30" | 6'20" | 6'30" | 6'30" | 6'50" |
| Wet-heat compression set (%) | 16.5 | 17.0 | 16.5 | 16.8 | 16.5 |
| Odor ** | None | None | Fnt | Fnt | Fnt |

* Weight parts based on 100 parts by weight of polyol
** Strg: strong, Med: medium, Fnt: faint

TABLE 4

| | Comparative Example | | | | |
|---|---|---|---|---|---|
| | 1 | 7 | 8 | 4 | 6 |
| **Catalyst (parts by weight) *** | | | | | |
| TEDA-L33 | 0.61 | 0.32 | 0.32 | 0.32 | 0.32 |
| TOYOCAT-ET | 0.15 | 0.08 | 0.08 | 0.08 | 0.08 |
| TMDDA | — | — | — | — | — |
| TMUNDA | — | — | — | — | — |
| TMDODA | — | — | — | — | — |
| TMHMDA | — | 0.35 | — | — | — |
| TMHDDA | — | — | 0.75 | — | — |
| NEM | — | — | — | 3.30 | — |
| DMEA | — | — | — | — | 0.75 |
| Reactivity (seconds) | | | | | |
| Cream time | 7 | 8 | 8 | 8 | 7 |
| Gel time | 80 | 79 | 80 | 79 | 79 |
| Rise time | 115 | 112 | 115 | 117 | 107 |
| Foam properties | | | | | |
| Free density (Kg/m$^3$) | 40.8 | 40.6 | 40.5 | 40.9 | 40.6 |
| Mold density (kg/m$^3$) | 50.3 | 50.6 | 50.5 | 50.7 | 50.6 |
| Moldability | 3 | 1 | 3 | 3 | 4 |
| Curing rate (min) | 7'50" | 6'30" | 7'50" | 7'50" | 8'0 |
| Wet heat compression set (%) | 18.0 | 18.0 | 18.5 | 20.5 | 22.0 |
| Odor ** | Med | Strg | Fnt | Strg | Strg |

* Weight parts based on 100 parts by weight of polyol
** Strg: strong, Med: medium, Fnt: faint

TABLE 5

| | Example | | | | | Comparative example |
|---|---|---|---|---|---|---|
| | 11 | 12 | 13 | 14 | 15 | 9 |
| **Catalyst (parts by weight) *** | | | | | | |
| TEDA-L33 | — | 1.40 | — | 0.71 | 0.71 | 2.80 |
| TOYOCAT-DT | — | — | 0.55 | 0.30 | 0.30 | — |
| DMDOA | 4.60 | 2.30 | 2.30 | 2.30 | — | — |
| DMTDA | — | — | — | — | 2.55 | — |
| DMOA | — | — | — | — | — | — |
| DMHDA | — | — | — | — | — | — |
| DMCHA | — | — | — | — | — | — |
| MDCHA | — | — | — | — | — | — |
| Reactivity (seconds) | | | | | | |
| Cream time | 14 | 14 | 10 | 12 | 13 | 14 |
| Gel time | 50 | 50 | 50 | 50 | 50 | 50 |
| Tack free time | 64 | 63 | 62 | 64 | 63 | 63 |
| Rise time | 77 | 73 | 78 | 76 | 78 | 73 |
| Foam properties | | | | | | |
| Free density (Kg/m$^3$) | 26.5 | 26.7 | 26.3 | 26.4 | 26.5 | 27.9 |
| Mold density (kg/m$^3$) | | | | | | |
| Overall | 29.5 | 29.7 | 28.0 | 28.7 | 28.8 | 31.8 |
| Core | 27.7 | 28.0 | 26.5 | 27.1 | 27.2 | 30.7 |
| Curing rate (Shore C) | 65 | 70 | 65 | 67 | 66 | 70 |
| Adhesion strength (kg/25 cm$^2$) | 11.0 | 9.5 | 9.0 | 9.5 | 9.5 | 3.9 |
| Dimension stability (%) | 23.0 | 20.2 | 10.0 | 12.0 | 13.0 | 23.0 |
| Odor ** | None | Fnt | Fnt | Fnt | Fnt | Med |

* Weight parts based on 100 parts by weight of polyol
** Strg: strong, Med: medium, Fnt: faint

TABLE 6

| | Comparative Example | | | | | |
|---|---|---|---|---|---|---|
| | 10 | 11 | 12 | 13 | 14 | 15 |
| **Catalyst (parts by weight) *** | | | | | | |
| TEDA-L33 | — | 0.95 | 0.40 | 0.40 | — | — |
| TOYOCAT-DT | 1.10 | 0.55 | 0.30 | 0.30 | — | — |
| DMDOA | — | — | — | — | — | — |
| DMTDA | — | — | — | — | — | — |
| DMOA | — | — | 2.00 | — | — | — |
| DMHDA | — | — | — | 3.00 | — | — |
| DMCHA | — | — | — | — | 2.40 | — |
| MDCHA | — | — | — | — | — | 11.0 |
| Reactivity (seconds) | | | | | | |
| Cream time | 7 | 10 | 11 | 11 | 13 | 12 |
| Gel time | 50 | 50 | 50 | 50 | 50 | 50 |
| Tack free time | 61 | 63 | 65 | 65 | 73 | 75 |
| Rise time | 80 | 74 | 79 | 77 | 78 | 85 |
| Foam properties | | | | | | |
| Free density (Kg/m$^3$) | 26.3 | 26.8 | 26.7 | 26.4 | 26.6 | 27.0 |
| Mold density (kg/m$^3$) | | | | | | |
| Overall | 30.0 | 29.7 | 29.7 | 30.2 | 29.2 | 30.3 |
| Core | 28.7 | 28.0 | 27.7 | 28.8 | 27.6 | 28.4 |

TABLE 6-continued

|  | Comparative Example | | | | | |
|---|---|---|---|---|---|---|
|  | 10 | 11 | 12 | 13 | 14 | 15 |
| Curing rate (Shore C) | 50 | 58 | 58 | 55 | 60 | 20 |
| Adhesion strength (kg/25 cm$^2$) | 1.4 | 3.2 | 6.0 | 6.0 | 3.3 | 1.2 |
| Dimension stability (%) | 9.4 | 20.0 | 30.0 | 27.5 | 24.1 | 7.3 |
| Odor ** | Med | Med | Strg | Fnt | Strg | Fnt |

\* Weight parts based on 100 parts by weight of polyol  
\*\* Strg: strong, Med: medium, Fnt: faint

TABLE 7

|  | Example | | | | | Comparative example |
|---|---|---|---|---|---|---|
|  | 16 | 17 | 18 | 19 | 20 | 9 |
| Catalyst parts by weight) * | | | | | | |
| TEDA-L33 | — | 1.40 | — | 0.71 | 0.71 | 2.80 |
| TOYOCAT-DT | — | — | 0.55 | 0.30 | 0.30 | — |
| TMDDA | 2.40 | 1.20 | 1.20 | 1.20 | — | — |
| TMDODA | — | — | — | — | 1.35 | — |
| TMHMDA | — | — | — | — | — | — |
| TMHDDA | — | — | — | — | — | — |
| DMCHA | — | — | — | — | — | — |
| MDCHA | — | — | — | — | — | — |
| Reactivity (seconds) | | | | | | |
| Cream time | 14 | 14 | 10 | 12 | 12 | 14 |
| Gel time | 50 | 51 | 49 | 51 | 50 | 50 |
| Tack free time | 64 | 64 | 63 | 63 | 64 | 63 |
| Rise time | 75 | 73 | 75 | 76 | 75 | 73 |
| Foam properties | | | | | | |
| Free density (Kg/m$^3$) | 26.3 | 26.5 | 26.4 | 26.4 | 26.4 | 27.9 |
| Mold density (kg/m$^3$) | | | | | | |
| Overall | 29.5 | 29.7 | 28.0 | 28.7 | 28.8 | 31.8 |
| Core | 27.7 | 28.0 | 26.5 | 27.1 | 27.2 | 30.7 |
| Curing rate (Shore C) | 64 | 69 | 66 | 68 | 67 | 70 |
| Adhesion strength (kg/25 cm$^2$) | 10.5 | 10.0 | 9.0 | 9.5 | 9.5 | 3.9 |
| Dimension stability (%) | 23.0 | 21.2 | 11.0 | 13.0 | 13.0 | 23.0 |
| Odor ** | None | Fnt | Fnt | Fnt | Fnt | Med |

\* Weight parts based on 100 parts by weight of polyol  
\*\* Strg: strong, Med: medium, Fnt: faint

TABLE 8

|  | Comparative Example | | | | | |
|---|---|---|---|---|---|---|
|  | 10 | 11 | 16 | 17 | 14 | 15 |
| Catalyst (parts by weight) * | | | | | | |
| TEDA-L33 | — | 0.95 | 0.40 | 0.40 | — | — |
| TOYOCAT-DT | 1.10 | 0.55 | 0.30 | 0.30 | — | — |
| TMDDA | — | — | — | — | — | — |
| TMDODA | — | — | — | — | — | — |
| TMHMDA | — | — | 1.00 | — | — | — |
| TMHDDA | — | — | — | 2.00 | — | — |
| DMCHA | — | — | — | — | 2.40 | — |

TABLE 8-continued

|  | Comparative Example | | | | | |
|---|---|---|---|---|---|---|
|  | 10 | 11 | 16 | 17 | 14 | 15 |
| MDCHA | — | — | — | — | — | 11.0 |
| Reactivity (seconds) | | | | | | |
| Cream time | 7 | 10 | 12 | 11 | 13 | 12 |
| Gel time | 50 | 50 | 50 | 49 | 50 | 50 |
| Tack free time | 61 | 63 | 63 | 65 | 73 | 75 |
| Rise time | 80 | 74 | 75 | 78 | 78 | 85 |
| Foam properties | | | | | | |
| Free density (Kg/m$^3$) | 26.3 | 26.8 | 26.5 | 26.5 | 26.6 | 27.0 |
| Mold density (kg/m$^3$) | | | | | | |
| Overall | 30.0 | 29.7 | 29.5 | 30.0 | 29.2 | 30.3 |
| Core | 28.7 | 28.0 | 27.9 | 28.4 | 27.6 | 28.4 |
| Curing rate (Shore C) | 50 | 58 | 57 | 53 | 60 | 20 |
| Adhesion strength (kg/25 cm$^2$) | 1.4 | 3.2 | 3.5 | 6.0 | 3.3 | 1.2 |
| Dimension stability (%) | 9.4 | 20.0 | 30.5 | 28.5 | 24.1 | 7.3 |
| Odor ** | Med | Med | Strg | Fnt | Strg | Fnt |

\* Weight parts based on 100 parts by weight of polyol  
\*\* Strg: strong, Med: medium, Fnt: faint

What is claimed is:

1. A process for producing a flexible polyurethane foam by reaction of a polyol and a polyisocyanate in the presence of an amine catalyst, a blowing agent, and a foam stabilizer, the amine catalyst comprising at least one amine compound represented by General Formula (1) below:

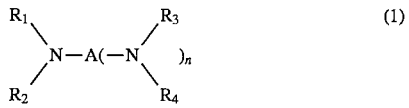

where $R_1$, $R_2$, $R_3$, and $R_4$ are respectively an alkyl group of 1 to 6 carbons independently; n is an integer of 0 or 1; and A is an alkyl group of 11 to 14 carbons when n is 0, or an alkylene group of 11 to 15 carbons when n is 1, wherein said blowing agent comprises water in an amount ranging from 2 to 10 parts by weight based on 100 parts by weight of said polyol, and wherein the polyol has an average functionality ranging from 2 to 5, and an average hydroxyl number ranging from 20 to 100 mgKOH/g.

2. The process according to claim 1, wherein at least one of the amine of General Formula (1) as the amine catalyst, and a gelling catalyst and/or a blowing catalyst are employed in combination.

3. The process according to any of claims 1 and 2, wherein the amine compound represented by General Formula (1) is selected from dimethyldodecylamine or dimethyltetradecylamine.

4. The process according to any of claims 1 and 2, wherein the amine compound represented by General Formula (1) is selected from tetramethyl-undecane-diamine, tetramethyl-dodecanediamine, or tetramethyl-tetradecane-diamine.

5. The process according to claim 2, wherein the gelling catalyst is used in an amount ranging from 5 to 80%, and/or the blowing catalyst is used in an amount ranging from 1 to 60% by weight based on the total amount of the catalyst.

6. The process according to claim 2, wherein the gelling catalyst is at least one selected from triethylenediamine, 1,8-diazabicyclo[5.4.0]undecene-7, 1-methylimidazole, 1,2-dimethylimidazole, or 1-isobutyl-2-methylimidazole.

7. The process according to claim 2, wherein the blowing catalyst is at least one selected from bis(2-dimethylaminoethyl)ether, N,N,N',N",N"-pentamethyldiethylenetriamine, or N,N,N',N",N'",N'"-hexamethyltriethylenetetramine.

8. A process for producing a rigid polyurethane foam by reaction of a polyol and a polyisocyanate in the presence of an amine catalyst, a blowing agent, and a foam stabilizer, the amine catalyst comprising at least one amine compound represented by General Formula (1) below:

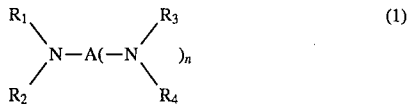

where $R_1$, $R_2$, $R_3$, and $R_4$ are respectively an alkyl group of 1 to 6 carbons independently; n is an integer of 0 or 1; and A is an alkyl group of 11 to 14 carbons when n is 0, or an alkylene group of 11 to 15 carbons when n is 1, the blowing agent comprising water or a mixture of water with a hydrocarbon, a hydrochlorofluorocarbon, or a hydrofluorocarbon; the water is used in an amount ranging from 2 to 15 parts by weight based on 100 parts by weight of the polyol, and the polyol has an average functionality ranging from 4 to 8, and an average hydroxyl number ranging from 200 to 800 mgKOH/g.

9. The process according to claim 8, wherein at least one of the amine of General Formula (1) as the amine catalyst, and a gelling catalyst and/or a blowing catalyst are employed in combination.

10. The process according to claim 8 or 9, wherein the amine compound represented by General Formula (1) is selected from dimethyldodecylamine and dimethyltetradecylamine.

11. The process according to claim 8 or 9, wherein the amine compound represented by General Formula (1) is selected from tetramethyl-undecane-diamine, tetramethyl-dodecane-diamine, or tetramethyl-tetradecane-diamine.

12. The process according to claim 9, wherein the gelling catalyst is used in an amount ranging from 5 to 80%, and/or the blowing catalyst is used in an amount ranging from 1 to 60% by weight based on the total amount of the catalyst.

13. The process according to claim 9 or 15, wherein the gelling catalyst is at least one selected from triethylenediamine, 1,8-diazabicyclo[5.4.0]undecene-7, 1-methylimidazole, 1,2-dimethylimidazole, or 1-isobutyl-2-methylimidazole.

14. The process according to claim 9, wherein the blowing catalyst is at least one selected from bis(2-dimethylaminoethyl)ether, N,N,N',N",N"-pentamethyldiethylenetriamine, or N,N,N',N",N'",N'"-hexamethyltriethylenetetramine.

* * * * *